US010746283B2

(12) United States Patent
Anglin

(10) Patent No.: US 10,746,283 B2
(45) Date of Patent: Aug. 18, 2020

(54) DAMPED FLUID TRANSFER TUBE FOR A GAS TURBINE ENGINE

(71) Applicant: United Technologies Corporation, Farmington, CT (US)

(72) Inventor: Christopher T. Anglin, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 89 days.

(21) Appl. No.: 15/681,551

(22) Filed: Aug. 21, 2017

(65) Prior Publication Data
US 2019/0056024 A1    Feb. 21, 2019

(51) Int. Cl.
| F16H 57/04 | (2010.01) |
| F01D 9/06 | (2006.01) |
| F16C 3/02 | (2006.01) |
| F01D 25/04 | (2006.01) |
| F01D 25/16 | (2006.01) |

(52) U.S. Cl.
CPC ........... *F16H 57/043* (2013.01); *F01D 9/065* (2013.01); *F01D 25/04* (2013.01); *F01D 25/164* (2013.01); *F05D 2260/96* (2013.01); *F16C 3/02* (2013.01)

(58) Field of Classification Search
CPC ........ F02D 9/065; F02D 25/04; F02D 25/164; F16H 57/043; F16C 3/02; F05D 2260/96
USPC ....................................................... 415/119
See application file for complete search history.

(56) References Cited

U.S. PATENT DOCUMENTS

| 3,881,841 | A | * | 5/1975 | Straniti | ................. | F01D 25/164 |
| | | | | | | 415/131 |
| 5,593,274 | A | * | 1/1997 | Carreno | .................. | F01D 5/081 |
| | | | | | | 285/300 |
| 5,634,766 | A | * | 6/1997 | Cunha | ..................... | F01D 5/187 |
| | | | | | | 415/115 |
| 7,658,591 | B2 | * | 2/2010 | Dervaux | ................. | F01D 5/189 |
| | | | | | | 415/115 |
| 8,357,049 | B2 | * | 1/2013 | Horen | .................. | F16H 57/043 |
| | | | | | | 464/7 |
| 8,944,216 | B2 | * | 2/2015 | Rollins | ............... | F16H 57/0456 |
| | | | | | | 184/11.2 |
| 2008/0112791 | A1 | * | 5/2008 | Lee | ........................ | F01D 9/065 |
| | | | | | | 415/58.4 |
| 2014/0003920 | A1 | | 1/2014 | Scott | | |

(Continued)

OTHER PUBLICATIONS

EPO Search Report dated Jan. 29, 2019 for Application No. 18188337.2.

*Primary Examiner* — Hung Q Nguyen
*Assistant Examiner* — Susan E Scharpf
(74) *Attorney, Agent, or Firm* — Getz Balich LLC

(57) ABSTRACT

An assembly is provided for a gas turbine engine. This assemble includes a stationary structure configured with a first side, a second side and a bore that extends through the stationary structure between the first side and the second side. The assembly also includes a fluid transfer tube extending within the bore and forming a plenum between a sidewall of the fluid transfer tube and the stationary structure. The fluid transfer tube is configured with a first end at the first side, a second end at the second side, a flowpath and an aperture. The flowpath is at least partially formed by the sidewall and extends through the fluid transfer tube between the first end and the second end. The aperture fluidly couples the flowpath with the plenum.

20 Claims, 11 Drawing Sheets

(56) References Cited

U.S. PATENT DOCUMENTS

2015/0285095 A1\* 10/2015 Yeager .................... F01D 25/30
                                                    415/1
2018/0223734 A1   8/2018 Hendrickson \* cited by examiner

DAMPED FLUID TRANSFER TUBE FOR A GAS TURBINE ENGINE

BACKGROUND OF THE DISCLOSURE

1. Technical Field

This disclosure relates generally to a gas turbine engine and, more particularly, to a fluid circuit for a gas turbine engine.

2. Background Information

A gas turbine engine may include a fluid transfer tube for routing lubricant through a strut of a stationary structure. The fluid transfer tube may be substantially rigidly mounted to the strut. As a result, vibrations may be transmitted between the fluid transfer tube and the strut. Such vibrations may cause damage to the fluid transfer tube. There is a need in the art therefore for an improved system for routing fluid through a stationary structure.

SUMMARY OF THE DISCLOSURE

According to an aspect of the present disclosure, an assembly is provided for a gas turbine engine. This gas turbine engine assembly includes a stationary structure and a fluid transfer tube. The stationary structure is configured with a first side, a second side and a bore that extends through the stationary structure between the first side and the second side. The fluid transfer tube extends within the bore and forms a plenum between a sidewall of the fluid transfer tube and the stationary structure. The fluid transfer tube is configured with a first end at the first side, a second end at the second side, a flowpath and an aperture. The flowpath is at least partially formed by the sidewall and extends through the fluid transfer tube between the first end and the second end. The aperture fluidly couples the flowpath with the plenum.

According to another aspect of the present disclosure, another assembly is provided for a gas turbine engine. This gas turbine engine assembly includes a stationary structure, a fluid transfer tube and first and second seal joints. The stationary structure extends circumferentially around a rotational axis of the gas turbine engine. The stationary structure is configured as or otherwise includes a strut. The stationary structure is configured with an inner side, an outer side and a bore that extends radially, relative to the rotational axis, through the strut and between the inner side and the outer side. The fluid transfer tube is configured with the stationary structure to form an annular plenum between a sidewall of the fluid transfer tube and the strut. The fluid transfer tube is configured with a fluid inlet end at the outer side, a fluid outlet end at the inner side, a flowpath and an aperture. The flowpath extends radially, relative to the rotational axis, through the fluid transfer tube between the fluid inlet end and the fluid outlet end. The aperture extends through the sidewall and fluidly couples the flowpath with the annular plenum. The first and the second seal joints are between the sidewall and the strut. The annular plenum extends along the sidewall between the first seal joint and the second seal.

The assembly may also include first and second seal joints between the sidewall and the stationary structure. The plenum may extend along the sidewall from the first seal joint to the second seal joint.

The assembly may also include a first seal element and a second seal element. The first seal element may form the first seal joint between the sidewall and the stationary structure. The second seal element may form the second seal joint between the sidewall and the stationary structure.

The first seal element may be configured as or otherwise include an O-ring. The second seal element may also or alternatively be configured as or otherwise include an O-ring.

The plenum may have an annular cross-sectional geometry.

The first end may be a radial outer end and the second end may be a radial inner end. The aperture may be located closer to the first end than the second end.

The first end may be a radial outer end and the second end may be a radial inner end. The aperture may be located closer to the second end than the first end.

The first end may be a radial outer end and the second end may be a radial inner end. The aperture may be disposed proximate the first end. A second aperture, which may further fluidly couple the flowpath with the plenum, may be disposed proximate the second end.

A second aperture may further fluidly couple the flowpath with the plenum. The flowpath may extend through the fluid transfer tube along a centerline. The second aperture may be substantially aligned with the aperture along the centerline.

The aperture may be configured as a through-hole in the sidewall.

The fluid transfer tube may be further configured with a bleed passage that is configured as or otherwise includes the aperture. The bleed passage may be configured to direct fluid into the plenum at a first flow rate. The stationary structure may be further configured with an outlet passage configured to direct the fluid out of the plenum and into a chamber outside of the stationary structure at a second flow rate that is less than the first flow rate.

The outlet passage may be configured as or otherwise include a through-hole in the stationary structure. The through-hole may have a smaller cross-sectional area than the aperture.

The first end and/or the second end may be recessed into the bore of the stationary structure.

The assembly may also include a fluid supply fitting mounted to the stationary structure and fluidly coupled with the fluid transfer tube at the first end.

The assembly may also include a check valve configured with the fluid transfer tube and arranged within the flowpath.

The assembly may also include a bearing assembly and a fluid damper. The bearing assembly may include an outer bearing race. The fluid damper may circumscribe and engage with the outer bearing race. The fluid damper may be configured to receive fluid from the fluid transfer tube at the second end.

The stationary structure may include an annular array of struts. The bore may extend radially through one of the struts.

The fluid transfer tube may be removably mounted to the stationary structure. In addition or alternatively, the fluid transfer tube may be configured as a unitary, monolithic body.

The assembly may also include a lubricant system. The fluid transfer tube may be configured part of the lubricant system.

The foregoing features and the operation of the invention will become more apparent in light of the following description and the accompanying drawings.

DETAILED DESCRIPTION OF THE INVENTION

Figure 1:
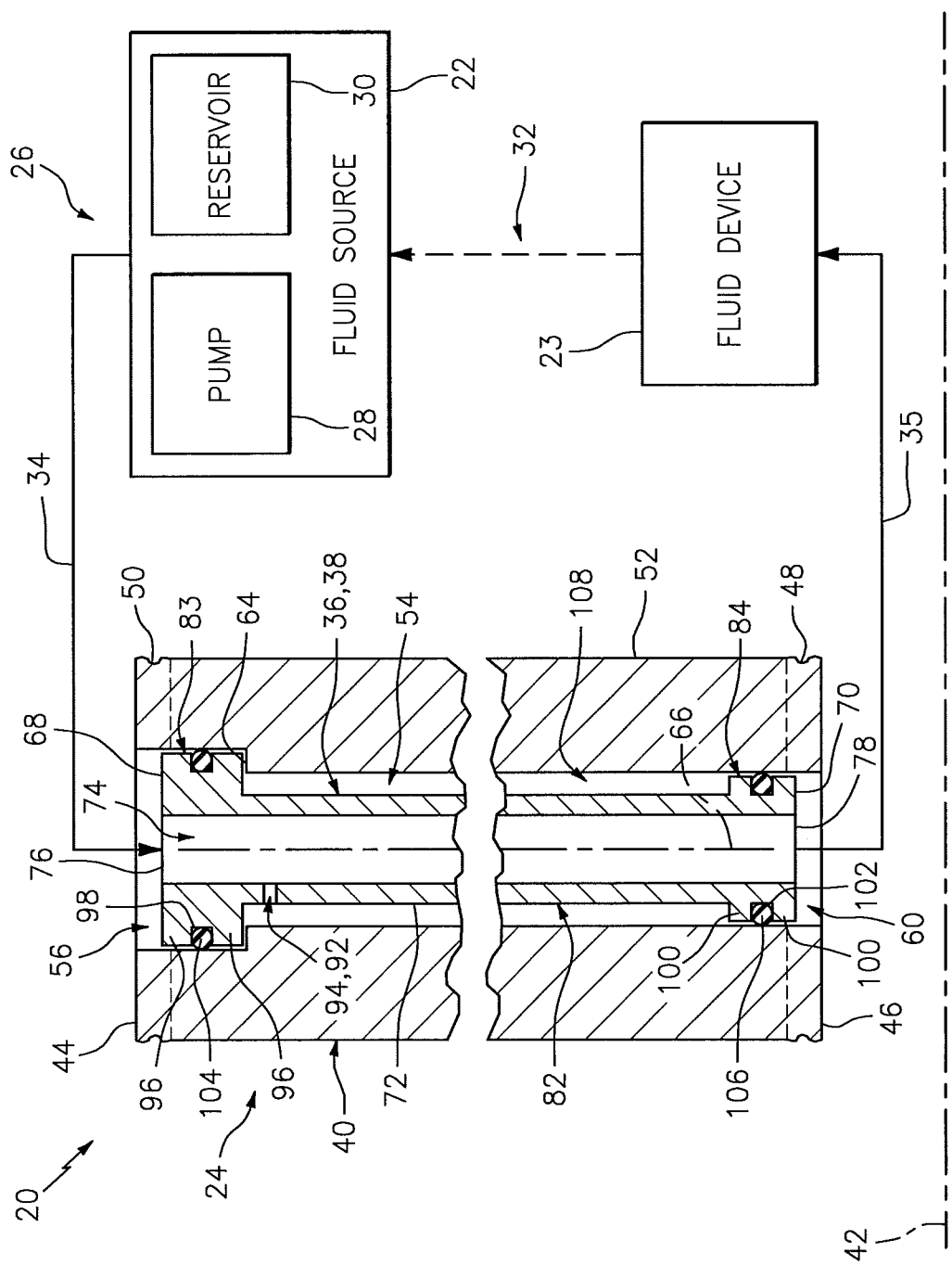
FIG. 1 is a schematic illustration of an assembly for a gas turbine engine.

FIG. 1 is a schematic illustration of an assembly 20 for a gas turbine engine. This gas turbine engine assembly 20 includes at least a fluid source 22, a fluid device 23 and a fluid passage 24, which assembly elements 22-24 are arranged together within a fluid circuit 26. This fluid circuit 26 may flow fluid such as, but not limited to, lubricant, fuel, coolant, hydraulic fluid, pneumatic fluid or any other type of fluid used within a gas turbine engine.

The fluid source 22 is configured to provide a flow of the fluid. The fluid source 22, for example, may include a fluid pump 28 and a fluid reservoir 30 (e.g., a tank, a chamber, etc.) fluidly coupled with the fluid pump 28. The fluid pump 28 may be arranged upstream, downstream or within the fluid reservoir 30, and is adapted to propel the fluid through the fluid circuit 26.

The fluid device 23 may be configured as any type of device that receives and/or uses the fluid during gas turbine engine operation. The fluid device 23, for example, may be actuated by the fluid. The fluid device 23 may be lubricated by the fluid. The fluid device 23 may be cooled by the fluid. In addition or alternatively, the fluid device 23 may redirect (e.g., atomize and/or spray) the fluid for further use within or by another downstream device or devices. Examples of such a fluid device include, but are not limited to, a fluid damper, a bearing assembly, a deaerator and a nozzle.

The fluid passage 24 is configured to fluidly couple and thereby flow fluid between the fluid source 22 and the fluid device 23. For example, the fluid passage 24 of FIG. 1 is configured as a source passage, which directs the fluid from the fluid source 22 to the fluid device 23. In such embodiments, the gas turbine engine assembly 20 may also include a return passage 32 for directing all (or some) of the fluid received by the fluid device 23 back to the fluid source 22. At least the assembly elements 22-24 and 32 may thereby form the fluid circuit 26 as a closed-loop fluid circuit; e.g., a lubrication circuit, or hydraulic circuit and/or a fuel circuit having a return. In alternative embodiments, however, the return passage 32 may be omitted such that at least the assembly elements 22-24 form the fluid circuit 26 as an open-loop fluid circuit; e.g., a fuel circuit. The present disclosure, of course, is not limited to the foregoing exemplary fluid circuit types and configurations.

The fluid passage 24 of FIG. 1 includes a plurality of passage segments 34-36. The upstream passage segment 34 fluidly couples and may extend between the fluid source 22 and the intermediate passage segment 36. The downstream passage segment 35 fluidly couples and may extend between the intermediate passage segment 36 and the fluid device 23. Each of these passage segments 34 and 35 may include one or more fluid conduits. The term "fluid conduit" is used herein to describe a length of hose, a length of pipe, a line, a fluid coupling, a portion of a structure forming a through-bore, a portion of a structure forming a through-hole, or any other element or assembly of elements that form a flowpath capable of directing fluid from at least an inlet orifice to an outlet orifice. In some embodiments, one or both of the passage segments 34 and/or 35 may each also be configured with one or more additional inline devices; e.g., a valve, a flow regulator, a filter, a debris sensor, a flow or pressure sensor, etc.

Figure 2:
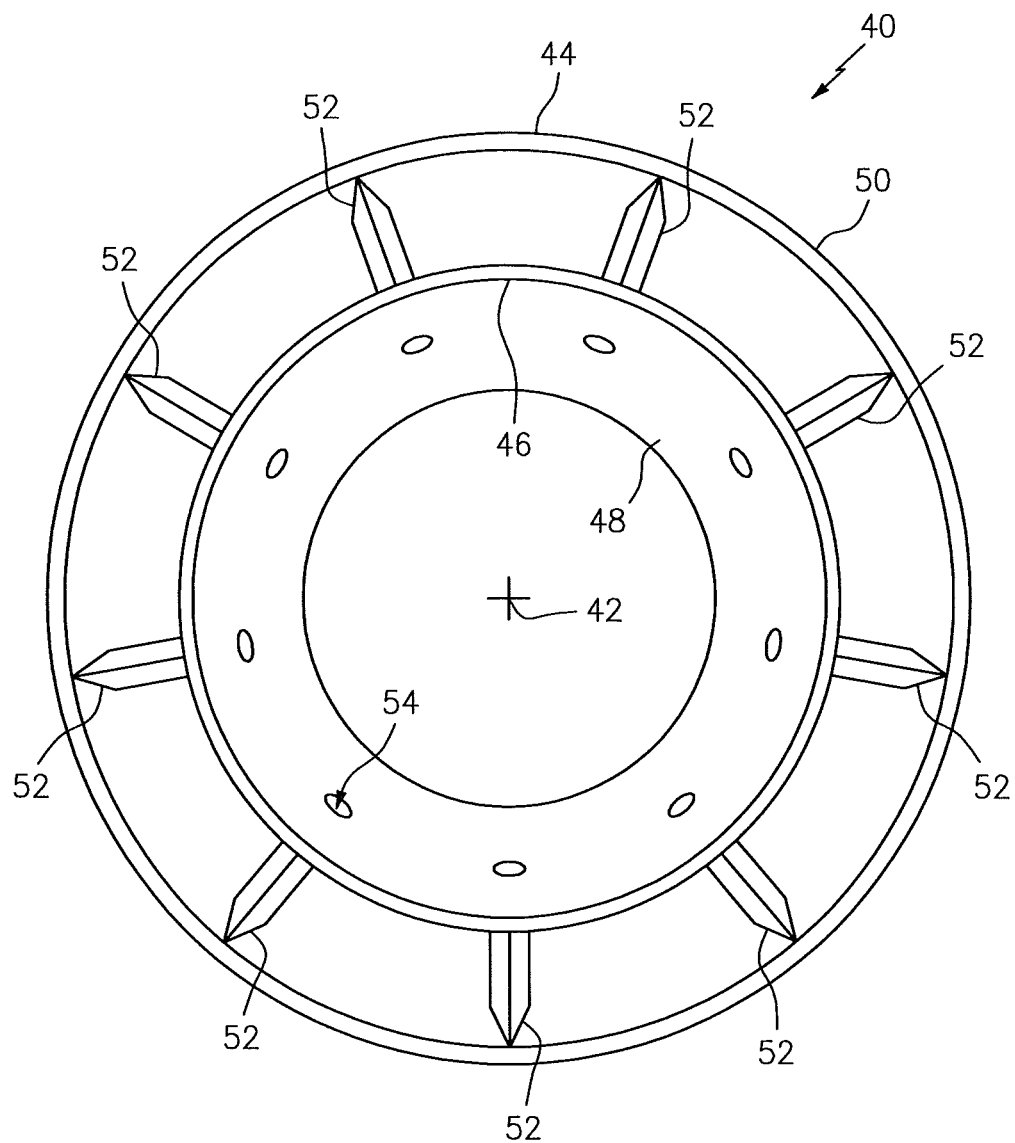
FIG. 2 is an end view illustration of a stationary structure.

The intermediate passage segment 36 of FIG. 1 is configured as or otherwise includes a fluid transfer tube 38 arranged with a stationary structure 40 of the gas turbine engine. This stationary structure 40 of FIG. 1 extends radially, relative to a rotational axis 42 of the gas turbine engine, between a radial outer side 44 and a radial inner side 46. Referring to FIG. 2, the stationary structure 40 may also extend circumferentially around the rotational axis 42, thereby providing the stationary structure 40 with an annular body. For example, in the specific embodiment of FIG. 2, the stationary structure 40 includes a (e.g., conical) tubular inner platform 48, a (e.g., conical) tubular outer platform 50 and one or more struts 52. These struts 52 are disposed about the rotational axis 42 in an annular array. The struts 52 connect and extend radially between the inner platform 48 and the outer platform 50. Each strut 52 may be configured as an airfoil; e.g., a structural guide vane. Alternatively, each strut 52 may be disposed within an airfoil shell.

Figure 3:
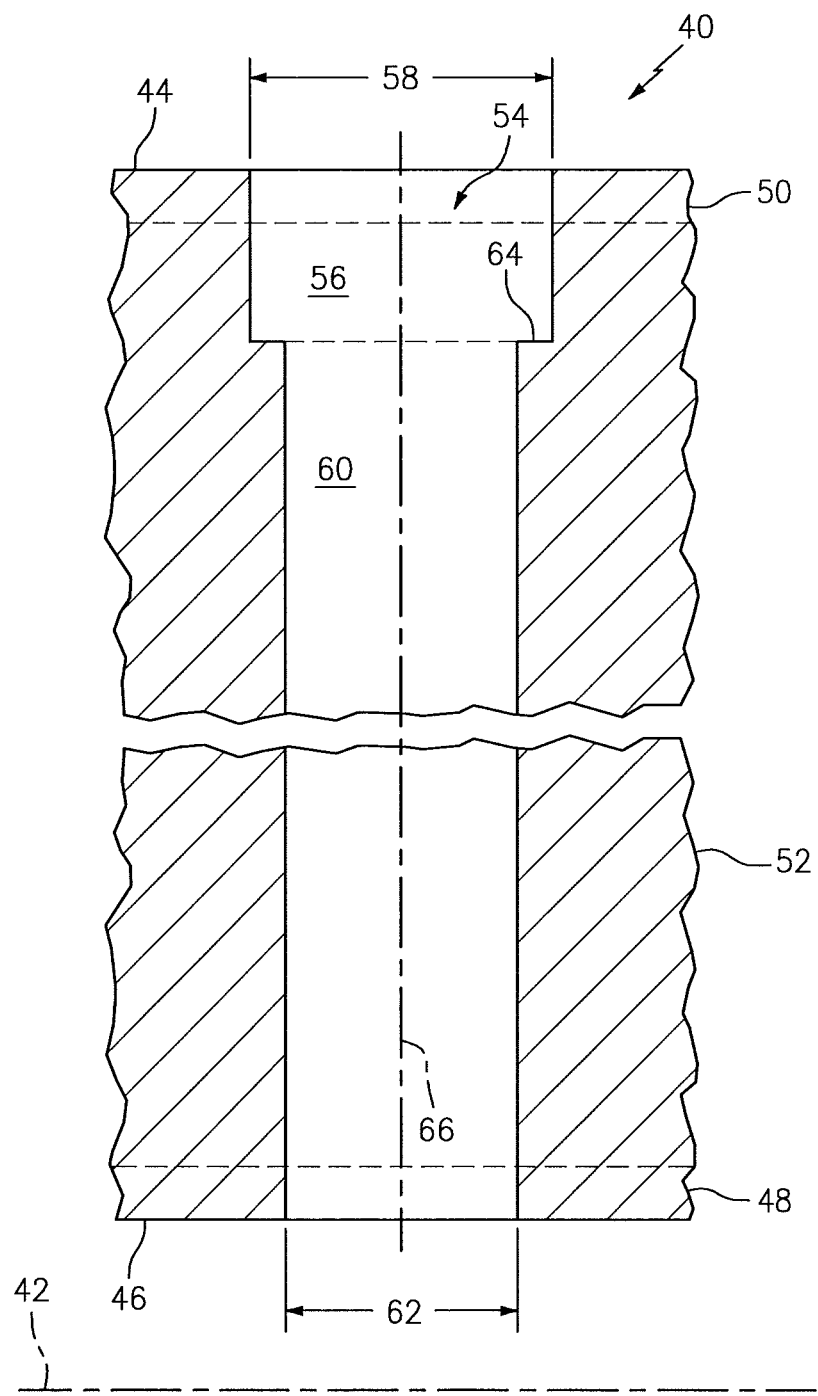
FIG. 3 is a side sectional illustration of a portion of the stationary structure.

Referring to FIG. 3, the stationary structure 40 is configured with at least one bore 54 (e.g., a through-bore), or a plurality of bores disposed about the axis 42. The bore 54 extends radially from the outer side 44 to the inner side 46 and sequentially though the outer platform 50, a respective one of the struts 52 and the inner platform 48. The bore 54 of FIG. 3 includes an outer portion 56 with a first width 58 (e.g., diameter) and an inner portion 60 with a second width 62 (e.g., diameter). The second width 62 may be smaller than the first width 58 thereby forming an annular shelf 64 at an intersection between the outer portion 56 and the inner portion 60. The outer portion 56 extends radially inward from the outer side 44, through the outer platform 50 and partially into the respective strut 52 to the inner portion 60. The inner portion 60 extends radially outward from the inner side 46, through the inner platform 48 and partially into the respective strut 52 to the outer portion 56.

Figure 4:
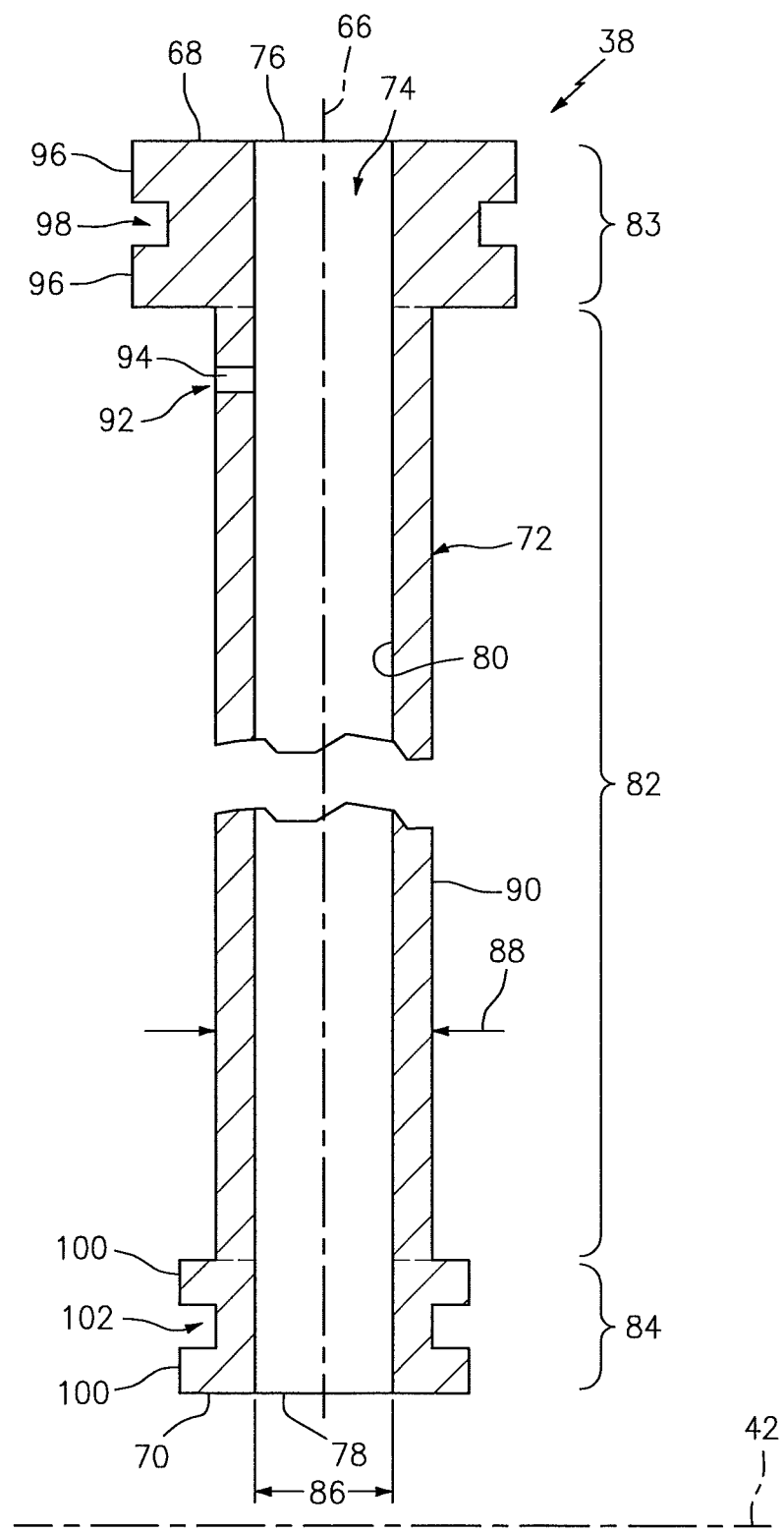
FIG. 4 is a side sectional illustration of a fluid transfer tube.

Referring to FIG. 4, the fluid transfer tube 38 has a longitudinal centerline 66, which extends radially relative to the rotational axis 42. The fluid transfer tube 38 has a radial outer end 68, a radial inner end 70 and a tubular sidewall 72. The sidewall 72 extends longitudinally along the centerline 66 and, thus, radially relative to the rotational axis 42 between the outer end 68 and the inner end 70 thereby forming a fluid flowpath 74 (e.g., a through-bore). This flowpath 74 extends longitudinally through the fluid transfer tube 38 (within the sidewall 72) between an inlet (or outlet) orifice 76 at the outer end 68 and an outlet (or inlet) orifice 78 at the inner end 70.

The sidewall 72 of FIG. 4 includes a cylindrical interior surface 80, a base portion 82, a radial outer end portion 83, and a radial inner end portion 84. The interior surface 80 at least partially forms the flowpath 74 through the fluid transfer tube 38 and may be carried by each sidewall portion 82-84. The interior surface 80 of FIG. 4, for example, has a substantially constant lateral width 86 (e.g., diameter relative to the longitudinal centerline 66) as the interior surface 80 extends along the centerline 66 between the inlet orifice 76 and the outlet orifice 78. However, in other embodiments, the lateral width 86 of the interior surface 80 may change. For example, the lateral width 86 of the interior surface 80 at (e.g., on, adjacent or proximate) the inner end portion 84 may be greater than the lateral width 86 within the portions 82 and 83 as shown, for example, in FIG. 5.

Referring again to FIG. 4, the base portion 82 extends longitudinally along the centerline 66 between and connects the outer end portion 83 and the inner end portion 84. The base portion 82 has an outer lateral width 88 defined by an exterior surface 90 of the sidewall 72. Briefly, this exterior surface 90 extends along a longitudinal length of the sidewall 72 between the outer end 68 and the inner end 70 and may be carried by the portions 82-84. The exterior surface 90 of FIG. 4 is thereby configured with a complex (e.g., tortuous) shape due to the varying configurations between the base portion 82 and the end portions 83 and 84 as described below in further detail. The outer lateral width 88 of the exterior surface 90 on the base portion 82 is smaller than the second width 62 (see FIG. 3) of the inner portion 60.

The base portion 82 is configured with a fluid bleed (e.g., an inlet/outlet) passage 92 formed by at least one aperture 94 (e.g., fluid orifice/through-hole). This aperture 94 extends laterally through the sidewall 72. The aperture 94 and, thus, the bleed passage 92 is fluidly coupled with the flowpath 74.

The outer end portion 83 is located at (e.g., on, adjacent or proximate) the outer end 68 of the fluid transfer tube 38. The outer end portion 83 of FIG. 4 forms the inlet orifice 76 to the flowpath 74. The outer end portion 83 may be configured such that the outer lateral width 88 of the exterior surface 90 thereon may fluctuate (e.g., change back-and-forth, increase/decrease/increase) as the exterior surface 90 extends from the base portion 82 to the outer end 68. The outer end portion 83 of FIG. 4, for example, includes a pair of annular flanges 96 and an annular channel 98 disposed longitudinally between and formed by the flanges 96. The outer lateral width 88 of the exterior surface 90 on the flanges 96 is greater than the outer lateral width 88 of the exterior surface 90 on the base portion 82. The outer lateral width 88 of the exterior surface 90 on the flanges 96 is also greater than the outer lateral width 88 of the exterior surface 90 in the channel 98, which may be substantially equal to, greater than or less than the outer lateral width 88 of the exterior surface 90 on the base portion 82.

The inner end portion 84 is located at (e.g., on, adjacent or proximate) the inner end 70 of the fluid transfer tube 38. The inner end portion 84 of FIG. 4 forms the outlet orifice 78 to the flowpath 74. The inner end portion 84 may be configured such that the outer lateral width 88 of the exterior surface 90 thereon may fluctuate (e.g., change back-and-forth, increase/decrease/increase) as the exterior surface 90 extends from the base portion 82 to the inner end 70. The inner end portion 84 of FIG. 4, for example, includes a pair of annular flanges 100 and an annular channel 102 disposed longitudinally between and formed by the flanges 100. The outer lateral width 88 of the exterior surface 90 on the flanges 100 is greater than the outer lateral width 88 of the exterior surface 90 on the base portion 82. The outer lateral width 88 of the exterior surface 90 on the flanges is also greater than the outer lateral width 88 of the exterior surface 90 in the channel 102, which may be substantially equal to, greater than or less than the outer lateral width 88 of the exterior surface 90 on the base portion 82. In addition, the outer lateral width 88 of the exterior surface 90 on the flanges 100 may be less than the outer lateral width 88 of the exterior surface 90 on the flanges 96 such that the flanges 96 and, thus, the outer end portion 83 project laterally out further than the inner end portion 84.

Referring again to FIG. 1, during assembly of the fluid transfer tube 38 with the stationary structure 40, an outer seal element 104 (e.g., an O-ring) is disposed within the channel 98 between the flanges 96. An inner seal element 106 (e.g., an O-ring) is disposed within the channel 102 between the flanges 100. The fluid transfer tube 38 is subsequently inserted into the bore 54 of the stationary structure 40 such that the tube 38 extends within the bore 54.

The outer end portion 83 is disposed within the outer portion 56. The outer end portion 83 and, more particularly, the flange 96 are abutted radially against the shelf 64 relative to the rotational axis 42. The outer end 68 is located at (e.g., on, adjacent or proximate) the outer side 44. For example, the outer end portion 83 and the outer end 68 may be radially recessed into the bore 54 relative to the rotational axis 42. However, in other embodiments, the elements 68, 83 may be radially flush with or protrude out from the outer side 44. The outer seal element 104 laterally (relative to the longitudinal centerline 66) and sealingly engages the stationary structure 40 and the sidewall 72 thereby forming an outer seal joint between the stationary structure 40 and the sidewall 72.

The inner end portion 84 is disposed within the inner portion 60. The inner end 70 is located at (e.g., on, adjacent or proximate) the inner side 46. For example, the inner end portion 84 and the inner end 70 may be radially recessed into the bore 54 relative to the rotational axis 42. However, in other embodiments, the elements 70, 84 may be radially flush with or protrude out from the inner side 46. The inner seal element 106 laterally (relative to the longitudinal centerline 66) and sealingly engages the stationary structure 40 and the sidewall 72 thereby forming an inner seal joint between the stationary structure 40 and the sidewall 72.

The base portion 82 is disposed within the inner portion 60. Since outer lateral width 88 (see FIG. 4) of the exterior surface 90 on the base portion 82 is smaller than the second width 62 (see FIG. 2) of the inner portion 60, an annular fluid plenum 108 is formed laterally relative to the longitudinal centerline 66 between the sidewall 72 and the stationary structure 40. This plenum 108 extends radially relative to the rotational axis 42 between the outer seal joint (e.g., seal element 104) and the inner seal joint (e.g., seal element 106). The plenum 108 is fluidly coupled with the flowpath 74 through the bleed passage 92 and its aperture 94 (or apertures).

The inlet orifice 76 is fluidly coupled with the upstream passage segment 34. The outlet orifice 78 is fluidly coupled with the downstream passage segment 35.

During operation, the fluid (e.g., lubricant) is directed from the fluid source 22 to the fluid device 23 through the fluid passage 24. Within the intermediate passage segment 36, the flowpath 74 receives the fluid from the upstream passage segment 34. A majority of this received fluid is directed through the flowpath 74 to the downstream passage segment 35. However, a relatively small portion of the received fluid is bled off from the flowpath 74 and directed into the plenum 108 through the bleed passage 92 and its aperture 94 (or apertures). The fluid within the plenum 108 may serve as a fluid buffer between the fluid transfer tube 38 and the stationary structure 40. In other words, the fluid within the plenum 108 may be operable to dampen vibrations that would otherwise be transferred between the stationary structure 40 and the fluid transfer tube 38.

Figure 5:
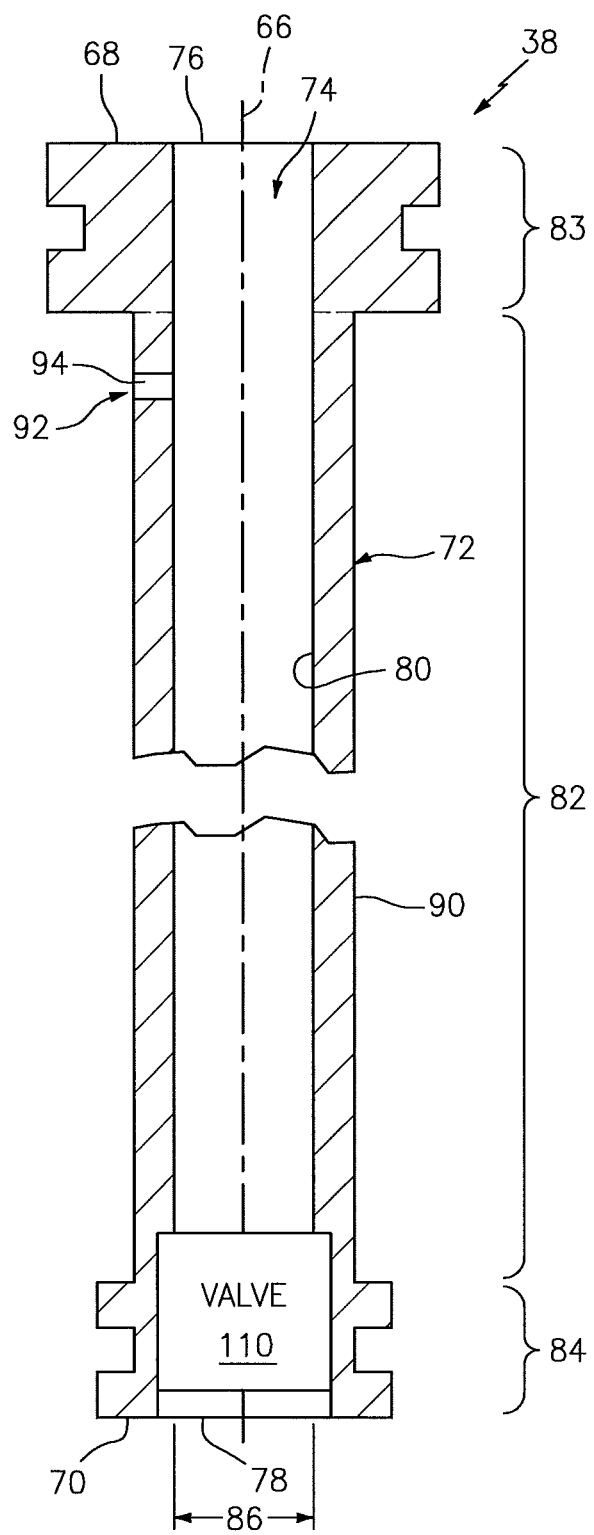
FIG. 5 is a side sectional illustration of another fluid transfer tube configured with a valve.

In some embodiments, referring to FIG. 5, a check valve 110 may be configured with the fluid transfer tube 38. The check valve 110 of FIG. 5 is arranged (e.g., completely) within the flowpath 74 and is located at (e.g., on, adjacent or proximate) the inner end 70; e.g., aligned with the inner end portion 84.

Figure 6:
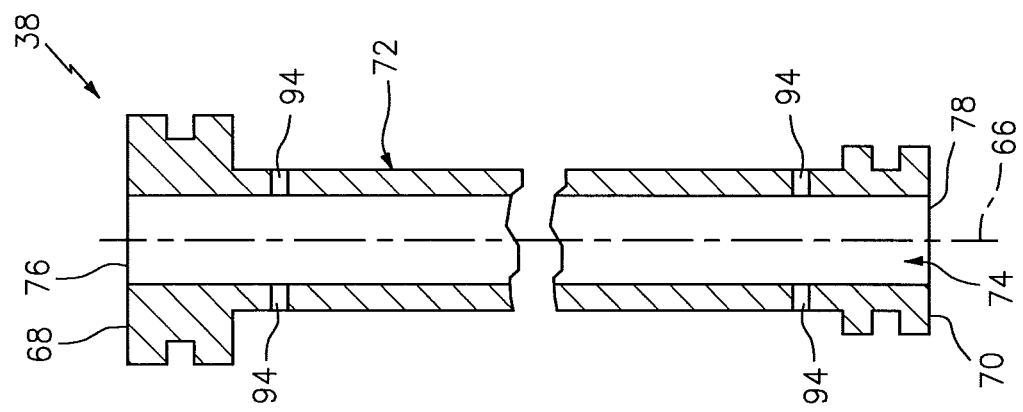
FIGS. 6-9 are side sectional illustration of still other fluid transfer tubes.
Figure 7:
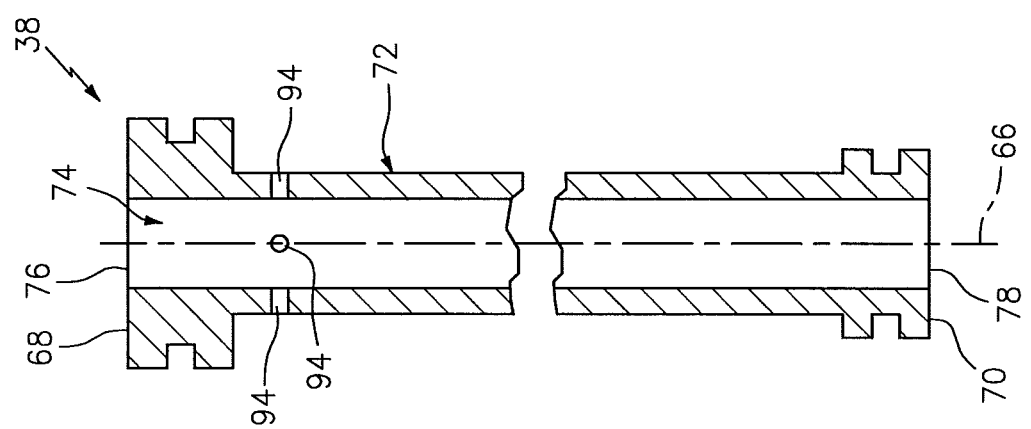

In some embodiments, referring to FIG. 6, the bleed passage may include more than one aperture 94 through the sidewall 72. In the specific embodiment of FIG. 6, the apertures 94 are arranged about the centerline 66 and approximately aligned along the centerline 66. However, in other embodiments, one or more of the apertures 94 may be offset from another one of the apertures 94 along the centerline 66 as shown in FIG. 7.

Figure 9:
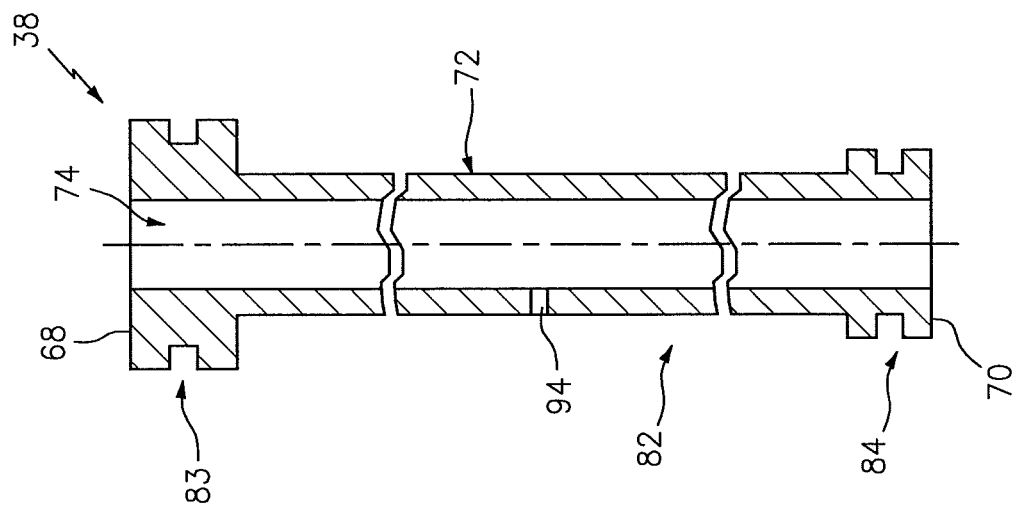
Figure 8:
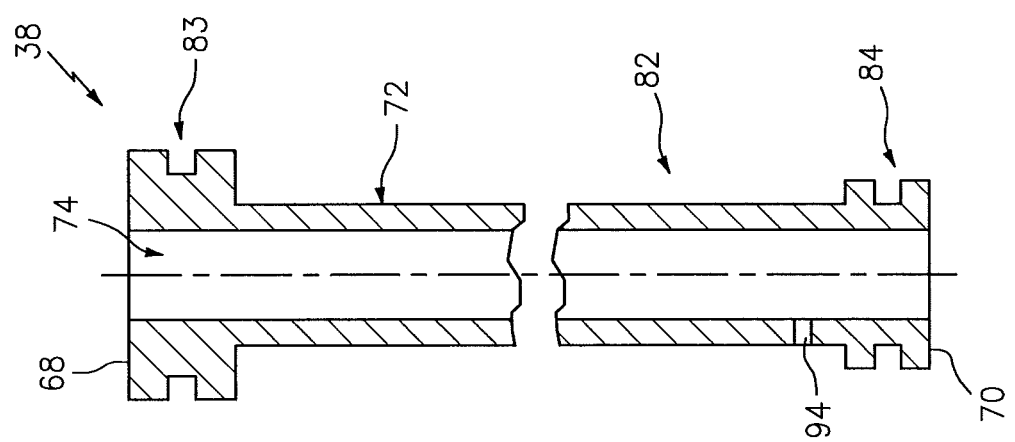

In some embodiments, the bleed passage and its aperture 94 (or apertures) may be located adjacent, proximate or otherwise towards the outer end portion 83 and the outer end 68. The aperture 94 of FIG. 4, for example, is disposed proximate the outer end portion 83 and the outer end 68. With such an arrangement, the aperture 94 is located closer to the outer end 68 and the outer end portion 83 than the inner end 70 and the inner end portion 84. In other embodiments, however, the bleed passage 92 and its aperture 94 (or apertures) may located adjacent, proximate or otherwise towards the inner end portion 84 and the inner end 70. The aperture 94 of FIG. 8, for example, is disposed proximate the inner end portion 84 and the inner end 70. With such an arrangement, the aperture 94 is located closer to the inner end 70 and the inner end portion 84 than the outer end 68 and the outer end portion 83. Of course, in still other embodiments, the bleed passage and its aperture 94 (or apertures) may be located about or precisely midway between the ends 68 and 70 and the end portions 83 and 84 as shown in FIG. 9; e.g., mid-length along the base portion 82.

Figure 10:
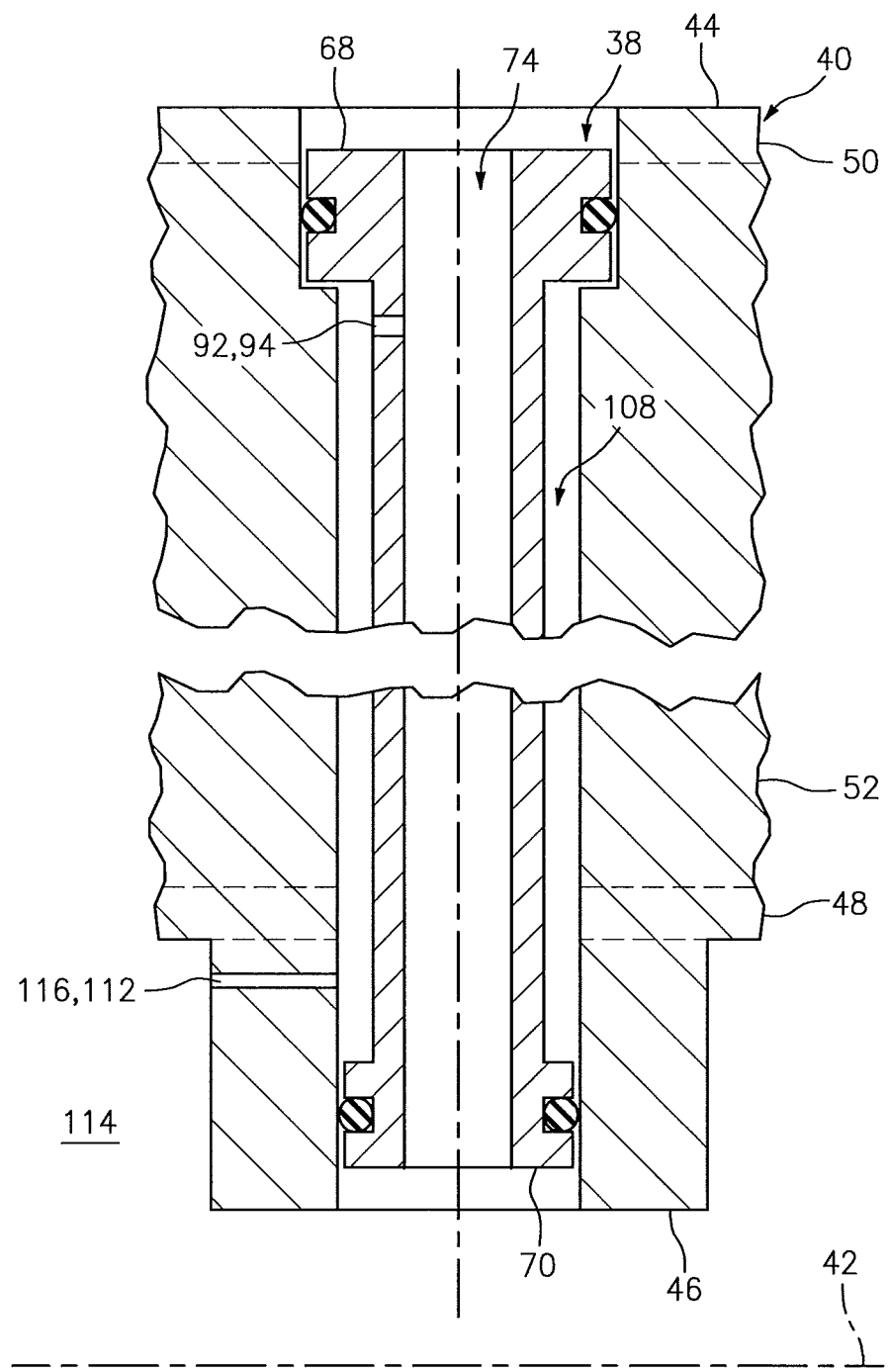
FIG. 10 is a side sectional illustration of the fluid transfer tube of FIG. 4 configured with another stationary structure.

In some embodiments, referring to FIG. 10, the stationary structure 40 may include an outlet passage 112. The outlet passage 112 of FIG. 10 is configured to direct a portion of the fluid within the plenum 108 into a chamber 114 outside of (or within) and/or adjacent the stationary structure 40. This outlet passage 112 is configured to direct the fluid out of the plenum 108 at a flow rate that is less than a flow rate of the fluid coming into the plenum 108 through the bleed passage 92. In the specific embodiment of FIG. 10, the outlet passage 112 includes a through-hole 116 with a smaller cross-sectional area than the aperture 94. Where the outlet passage 112 includes more than one through-hole 116 and/or the bleed passage 92 includes more than one aperture 94, the total cross-sectional area of the through-holes 116 is less than the total cross-sectional areas of the apertures 94.

Figure 11:
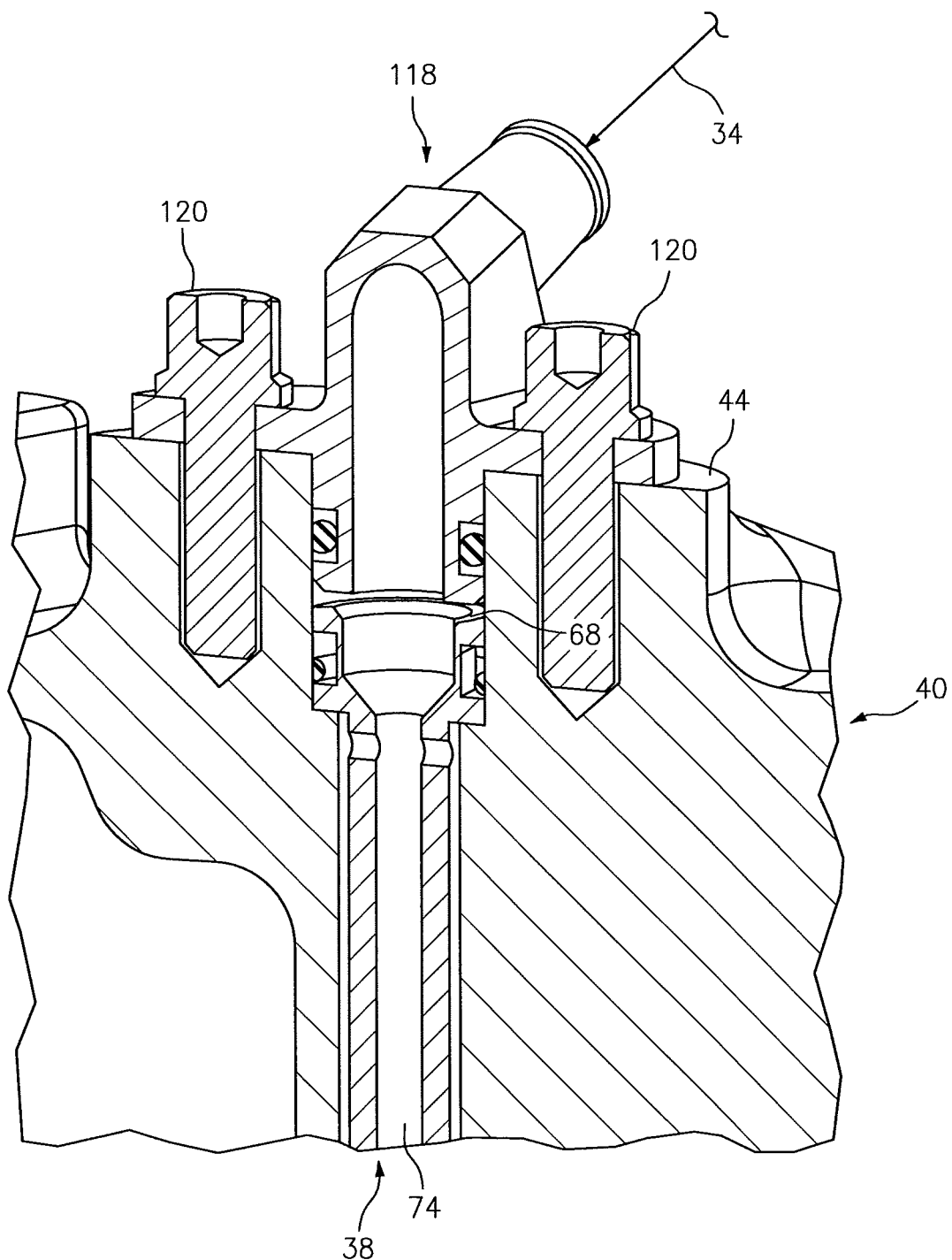
FIG. 11 is a perspective cutaway illustration of a portion of the gas turbine engine assembly configured with a fluid supply fitting.

In some embodiments, referring to FIG. 11, the intermediate passage segment 36 may also include a fluid supply fitting 118. This fluid supply fitting 118 is mounted to the stationary structure 40 by, for example, one or more fasteners 120 (e.g., bolts). The fluid supply fitting 118 is fluidly coupled with the fluid transfer tube 38 at the outer end 68. The fluid supply fitting 118 is also fluidly coupled with the upstream passage segment 34, thereby fluidly coupling a conduit (e.g., line) of the upstream passage segment 34 to the fluid transfer tube 38.

Figure 12:
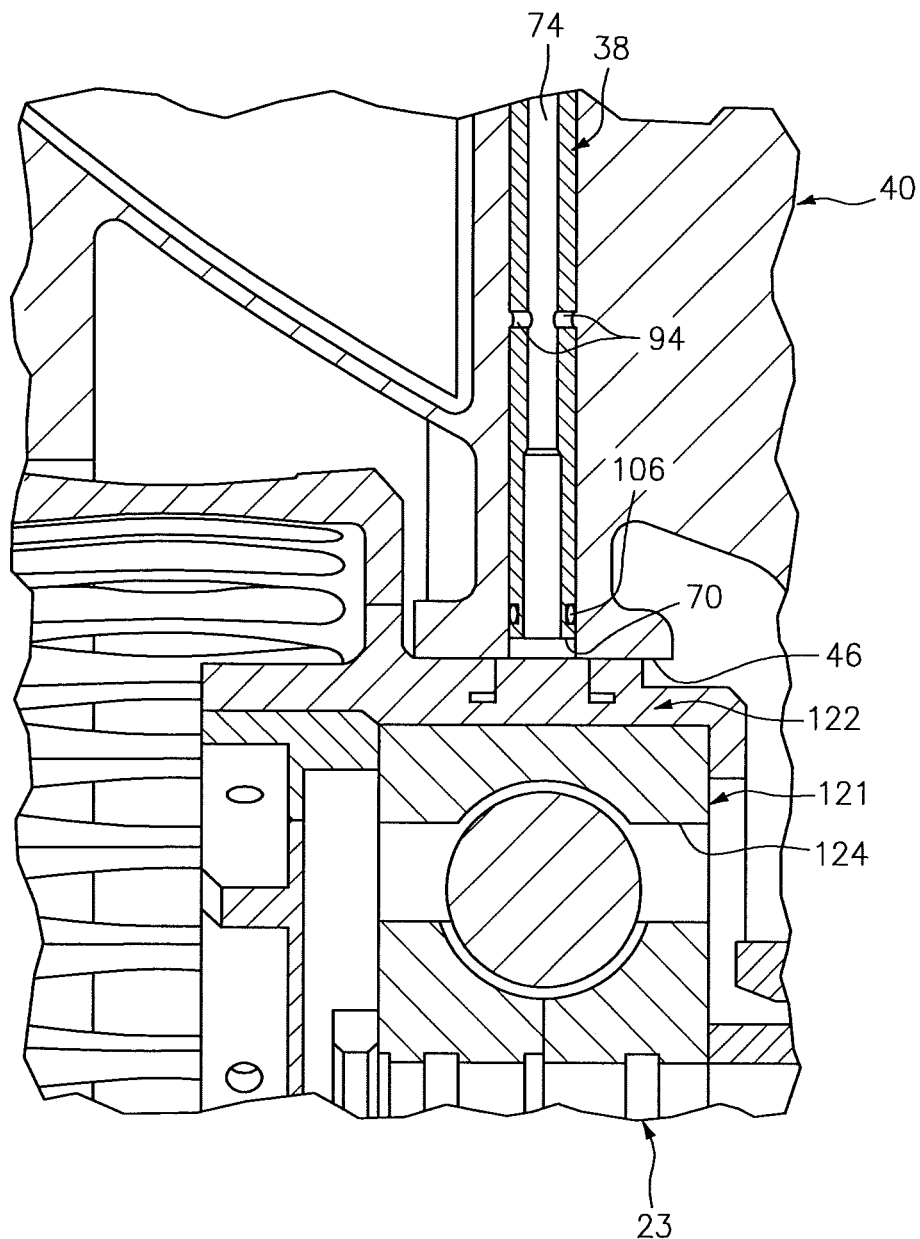
FIG. 12 is a perspective cutaway illustration of a portion of the gas turbine engine assembly configured with a bearing assembly and a fluid damper.

In some embodiments, referring to FIG. 12, the fluid device 23 includes a bearing assembly 121 (e.g., a roller bearing assembly) and a fluid damper 122. The bearing assembly 121 includes an outer bearing race 124. The fluid damper 122 circumscribes and engages with the outer bearing race 124. The fluid damper 122 is configured to receive the fluid from the fluid transfer tube 38 at the second end 70, where this fluid is used by the fluid damper 122 to dampen vibration transmission between the stationary structure 40 (or another stationary structure) and the outer bearing race 124.

The fluid transfer tube 38 embodiments described above may each be configured as a unitary, monolithic body.

The fluid transfer tube 38 embodiments described above are removable mounted with the stationary structure 40.

Figure 13:
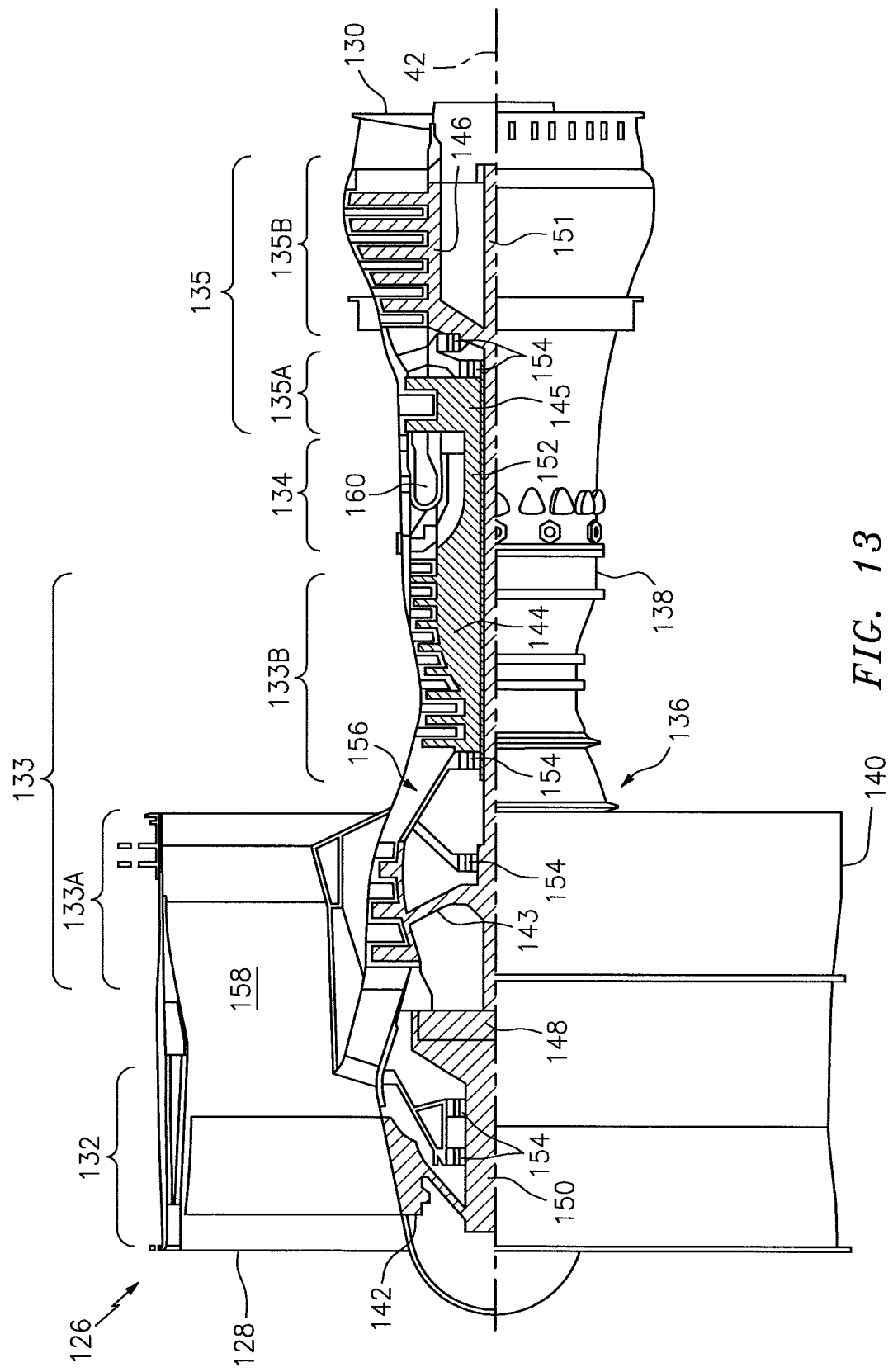
FIG. 13 is a partial side cutaway illustration of a gas turbine engine.

As described above, the assembly 20 of the present disclosure may be configured with a gas turbine engine. FIG. 13 illustrates one such exemplary gas turbine engine—a geared turbofan gas turbine engine 126. This turbine engine 126 includes various stationary structures, where the stationary structure 40 (see FIG. 1) can respectively be configured as anyone of the foregoing structures in the turbine engine 126 of FIG. 13, or other structures not mentioned herein.

The turbine engine 126 of FIG. 13 extends along the axis 42 or rotation between an upstream airflow inlet 128 and a downstream airflow exhaust 130. The turbine engine 126 includes a fan section 132, a compressor section 133, a combustor section 134 and a turbine section 135. The compressor section 133 includes a low pressure compressor (LPC) section 133A and a high pressure compressor (HPC) section 133B. The turbine section 135 includes a high pressure turbine (HPT) section 135A and a low pressure turbine (LPT) section 135B.

The engine sections 132-135 are arranged sequentially along the axis 42 within an engine housing 136. This housing 136 includes an inner case 138 (e.g., a core case) and an outer case 140 (e.g., a fan case). The inner case 138 may house one or more of the engine sections 133-135; e.g., an engine core. The outer case 140 may house at least the fan section 132.

Each of the engine sections 132, 133A, 133B, 135A and 135B includes a respective rotor 142-146. Each of these rotors 142-146 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 142 is connected to a gear train 148, for example, through a fan shaft 150. The gear train 148 and the LPC rotor 143 are connected to and driven by the LPT rotor 146 through a low speed shaft 151. The HPC rotor 144 is connected to and driven by the HPT rotor 145 through a high speed shaft 152. The shafts 150-152 are rotatably supported by a plurality of bearings 154. Each of these bearings 154 is connected to the engine housing 136 by at least one stationary structure such as, for example, an annular support strut.

During operation, air enters the turbine engine 126 through the airflow inlet 128. This air is directed through the fan section 132 and into a core gas path 156 and a bypass gas path 158. The core gas path 156 extends sequentially through the engine sections 133-135; e.g., an engine core. The air within the core gas path 156 may be referred to as "core air". The bypass gas path 158 extends through a bypass duct, which bypasses the engine core. The air within the bypass gas path 158 may be referred to as "bypass air".

The core air is compressed by the compressor rotors 143 and 144 and directed into a combustion chamber 160 of a combustor in the combustor section 134. Fuel is injected into the combustion chamber 160 and mixed with the compressed core air to provide a fuel-air mixture. This fuel air mixture is ignited and combustion products thereof flow through and sequentially cause the turbine rotors 145 and 146 to rotate. The rotation of the turbine rotors 145 and 146 respectively drive rotation of the compressor rotors 144 and 143 and, thus, compression of the air received from a core airflow inlet. The rotation of the turbine rotor 146 also drives rotation of the fan rotor 142, which propels bypass air through and out of the bypass gas path 158. The propulsion of the bypass air may account for a majority of thrust generated by the turbine engine 126, e.g., more than seventy-five percent (75%) of engine thrust. The turbine engine 126 of the present disclosure, however, is not limited to the foregoing exemplary thrust ratio.

The assembly 20 described above and illustrated in FIG. 1 may be included in various aircraft and industrial turbine engines other than the one described above as well as in other types of rotational equipment; e.g., wind turbines, water turbines, rotary engines, etc. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 13), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

The terms "radial", "inner", "outer", "inlet" and "outlet" are used above to describe the orientation of certain elements of the fluid transfer tube 38 and the stationary structure 40. However, the present disclosure is not limited to the foregoing exemplary orientation. For example, in other embodiments, the centerline 66 may run axially, tangentially or another direction relative to the axis 42. In another example, the inlet and the outlets and, thus, flow through the fluid transfer tube 38 may be reversed.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for a gas turbine engine, comprising:
a stationary structure configured with a first side, a second side and a bore that extends through the stationary structure between the first side and the second side; and
a lubricant system comprising a fluid transfer tube;
the fluid transfer tube extending within the bore and forming a plenum between a sidewall of the fluid transfer tube and the stationary structure, the fluid transfer tube configured with a first end at the first side, a second end at the second side, a flowpath and an aperture, the flowpath at least partially formed by the sidewall and extending through the fluid transfer tube between the first end and the second end, and the aperture fluidly coupling the flowpath with the plenum; and
the stationary structure comprising an annular array of struts, and the bore extending radially through one of the struts.

2. The assembly of claim 1, further comprising first and second seal joints between the sidewall and the stationary structure, wherein the plenum extends along the sidewall from the first seal joint to the second seal joint.

3. The assembly of claim 2, further comprising:
a first seal element forming the first seal joint between the sidewall and the stationary structure; and
a second seal element forming the second seal joint between the sidewall and the stationary structure.

4. The assembly of claim 3, wherein at least one of the first seal element or the second seal element comprises an O-ring.

5. The assembly of claim 1, wherein the plenum has an annular cross-sectional geometry.

6. The assembly of claim 1, wherein
the first end is a radial outer end and the second end is a radial inner end;
the aperture is disposed proximate the first end; and
a second aperture, further fluidly coupling the flowpath with the plenum, is disposed proximate the second end.

7. The assembly of claim 1, wherein the aperture is configured as a through-hole in the sidewall.

8. The assembly of claim 1, wherein
the fluid transfer tube is further configured with a bleed passage that comprises the aperture, and the bleed passage is configured to direct fluid into the plenum at a first flow rate; and
the stationary structure is further configured with an outlet passage configured to direct the fluid out of the plenum and into a chamber outside of the stationary structure at a second flow rate that is less than the first flow rate.

9. The assembly of claim 8, wherein the outlet passage comprises a through-hole in the stationary structure, and the through-hole has a smaller cross-sectional area than the aperture.

10. The assembly of claim 1, wherein at least the first end or the second end is recessed into the bore of the stationary structure.

11. The assembly of claim 1, further comprising a fluid supply fitting mounted to the stationary structure and fluidly coupled with the fluid transfer tube at the first end.

12. The assembly of claim 1, further comprising a check valve configured with the fluid transfer tube and arranged within the flowpath.

13. The assembly of claim 1, further comprising:
a bearing assembly comprising an outer bearing race; and
a fluid damper circumscribing and engaged with the outer bearing race, wherein the fluid damper is configured to receive fluid from the fluid transfer tube at the second end.

14. The assembly of claim 1, wherein the fluid transfer tube is removably mounted to the stationary structure and is configured as a unitary, monolithic body.

15. The assembly of claim 1, wherein
the first end is a radial outer end and the second end is a radial inner end; and
the aperture is located closer to the first end than the second end.

16. The assembly of claim 1, wherein
the first end is a radial outer end and the second end is a radial inner end; and
the aperture is located closer to the second end than the first end.

17. The assembly of claim 1, wherein
a second aperture further fluidly couples the flowpath with the plenum;
the flowpath extends through the fluid transfer tube along an axial centerline; and
the second aperture is substantially axially aligned with the aperture relative to the axial centerline.

18. An assembly for a gas turbine engine, comprising:
a stationary structure configured with a first side, a second side and a bore that extends through the stationary structure between the first side and the second side; and
a lubricant system comprising a fluid transfer tube;
the fluid transfer tube extending within the bore and forming a plenum between a sidewall of the fluid transfer tube and the stationary structure, the fluid transfer tube configured with a first end at the first side, a second end at the second side, a flowpath and an aperture, the flowpath at least partially formed by the sidewall and extending through the fluid transfer tube between the first end and the second end, and the aperture fluidly coupling the flowpath with the plenum;
wherein the first end is a radial outer end and the second end is a radial inner end; and
wherein the aperture is located closer to the first end than the second end.

19. An assembly for a gas turbine engine, comprising:
a stationary structure configured with a first side, a second side and a bore that extends through the stationary structure between the first side and the second side; and
a lubricant system comprising a fluid transfer tube;
the fluid transfer tube extending within the bore and forming a plenum between a sidewall of the fluid transfer tube and the stationary structure, the fluid transfer tube configured with a first end at the first side, a second end at the second side, a flowpath and an aperture, the flowpath at least partially formed by the sidewall and extending through the fluid transfer tube between the first end and the second end, and the aperture fluidly coupling the flowpath with the plenum;
wherein the first end is a radial outer end and the second end is a radial inner end; and
wherein the aperture is located closer to the second end than the first end.

20. An assembly for a gas turbine engine, comprising:
a stationary structure configured with a first side, a second side and a bore that extends through the stationary structure between the first side and the second side; and
a lubricant system comprising a fluid transfer tube;
the fluid transfer tube extending within the bore and forming a plenum between a sidewall of the fluid transfer tube and the stationary structure, the fluid transfer tube configured with a first end at the first side, a second end at the second side, a flowpath and an aperture, the flowpath at least partially formed by the sidewall and extending through the fluid transfer tube between the first end and the second end, and the aperture fluidly coupling the flowpath with the plenum;
wherein a second aperture further fluidly couples the flowpath with the plenum;
wherein the flowpath extends through the fluid transfer tube along an axial centerline; and
wherein the second aperture is substantially axially aligned with the aperture relative to the axial centerline.

* * * * *